United States Patent [19]

Yamaki et al.

[11] 4,086,517
[45] Apr. 25, 1978

[54] SYSTEM FOR CONTROLLING NUMERICALLY CONTROLLED MACHINE TOOL USED FOR CUTTING THREADS

[75] Inventors: Hiromi Yamaki; Hiroaki Arai, both of Nagoya, Japan

[73] Assignee: Okuma Machinery Works Ltd., Nagoya, Japan

[21] Appl. No.: 674,097

[22] Filed: Apr. 6, 1976

[51] Int. Cl.² ............................................ G05B 19/24
[52] U.S. Cl. ..................................... 318/39; 318/571; 318/563
[58] Field of Search ................. 318/561, 39, 571, 563, 318/603

[56] References Cited

U.S. PATENT DOCUMENTS

| | | | |
|---|---|---|---|
| 3,675,517 | 7/1972 | Tadayoshi | 318/571 X |
| 3,720,135 | 3/1973 | Merner et al. | 318/571 X |
| 3,798,524 | 3/1974 | Okamoto | 318/571 |
| 3,836,834 | 9/1974 | Abbatiello et al. | 318/563 |
| 3,949,285 | 4/1976 | Rosshirt | 318/603 X |

*Primary Examiner*—B. Dobeck
*Attorney, Agent, or Firm*—Jay L. Chaskin

[57] ABSTRACT

A system for controlling the operation of a numerically controlled machine tool used for cutting threads on workpieces, in which means are provided so that the quality of the products may not be adversely affected even when the thread cutting operation is interrupted for some reasons incidental to the thread cutting. The control system comprises a thread cutting interruption control circuit consisting of an adder-subtractor automatically carrying out addition or subtraction of the output of a thread pitch memory to and from a pair of outputs of a function generator variable depending on the position of the tool along a predetermined path, a temporary memory storing the information of a thread cutting command position read by a tape reader and stored in a first memory, and a thread cutting command position changing circuit applying the output of the adder-subtractor to the first memory in response to the application of an interruption instruction signal during the thread cutting operation thereby replacing the information of the thread cutting command position previously stored in the first memory by the output of the adder-subtractor, and, on the other hand, applying the output of the temporary memory to the first memory in response to the application of a restarting instruction signal thereby restarting the thread cutting cycle again after elimination of the cause requiring the interruption.

14 Claims, 2 Drawing Figures

SYSTEM FOR CONTROLLING NUMERICALLY CONTROLLED MACHINE TOOL USED FOR CUTTING THREADS

BACKGROUND OF THE INVENTION

1. Field of the Invention

This invention relates to a system for controlling the operation of a numerically controlled machine tool used for cutting threads on workpieces, in which means are provided so that the quality of the products may not be adversely affected even when the thread cutting operation may be interrupted for some reasons incidental to the thread cutting.

2. Description of the Prior Art

A numerically controlled machine tool is employed widely for cutting threads on workpieces. While the numerically controlled machine tool can satisfactorily work for this purpose, a trouble tending to give rise to breakage of the threading tool or tending to produce a reject has frequently occurred when the chips twine around the workpiece being machined. Although the chips can be manually removed after interrupting the motion of the tool slide, mere interruption on the motion of the tool slide only for the removal of the chips has inevitably resulted in such an objectionable situation that a groove of substantial width is necessarily formed which renders the product unfit for use as a mechanical part.

SUMMARY OF THE INVENTION

It is a primary object of the present invention to provide a novel and improved system for controlling the operation of a numerically controlled machine tool used for cutting threads on a workpiece, in which means are provided for effecting "pull-up motion of the tool" as soon as the thread cutting operation of the tool is interrupted in response to the application of an interruption instruction signal which appears for some reasons incidental to the thread cutting, so that the quality of the product may not be adversely affected even when the thread cutting operation of the tool is interrupted. The term "pull-up motion of the tool" is used herein to denote such motion of the tool that, in response to the application of an interruption instruction signal during the thread cutting operation of the tool, the tool is moved in both the direction of the X-axis and the direction of the Z-axis in synchronism with the rotation of the main spindle by a distance corresponding to one thread pitch so that the tool can be pulled up to the position at which no damage is imparted to the threads being cut.

The present invention contemplates the provision of a system for controlling the operation of a numerically controlled machine tool used for cutting threads on a workpiece, in which means are provided for effecting the "pull-up motion of the tool" as soon as the thread cutting operation of the tool is interrupted in response to the application of an interruption instruction signal, and then, automatically quickly returning the tool to the thread cutting cycle starting position.

DESCRIPTION OF THE PREFERRED EMBODIMENT

A preferred embodiment of the present invention will be described in detail with reference to the drawings.

Figure 1:
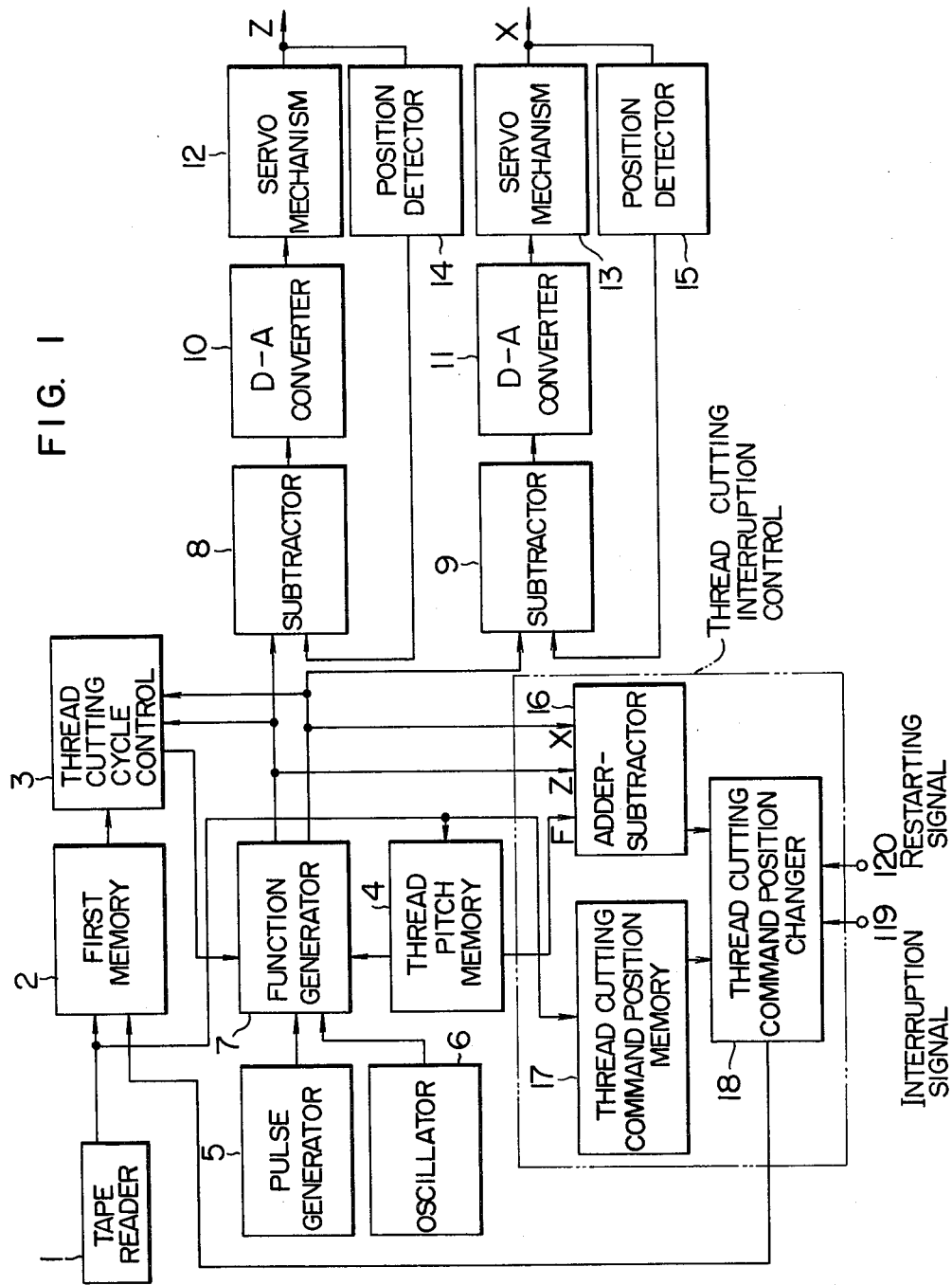
FIG. 1 is a block diagram of a preferred embodiment of the system according to the present invention for controlling the operation of a numerically controlled machine tool used for thread cutting.

Referring to FIG. 1, a tape reader 1 reads various input information recorded on a tape 1 for controlling the operation of a numerically controlled machine tool which may be a lathe used for cutting threads on a workpiece. The input information include information instructing the thread cutting code, the thread pitch, the thread cutting cycle starting position required for cutting the threads, and the thread cutting command position in the thread cutting cycle. A first memory 2 stores these input information except the thread pitch read by the tape reader 1. The output of this first memory 2 is applied to a thread cutting cycle control circuit 3 to be continuously compared with a pair of outputs of a function generator 7 described later. This thread cutting cycle control circuit 3 acts to control the thread cutting cycle by continuously comparing the latter imputs with the former input and also to store the information of the thread cutting cycle starting position. A thread pitch memory 4 stores the thread pitch information included in the input information ready by the tape reader 1.

A pulse generator 5 generates a train of pulses proportional to the rotation of the main spindle of the numerically controlled machine tool. This rotation-responsive pulse signal includes a synchronizing pulse signal for detecting the angular position of the rotating main spindle, hence, the cutting phase of the threads. An oscillator 6 generates a clock signal having a predetermined frequency. The control signal output of the thread cutting cycle control circuit 3, the output of the thread pitch memory 4 representative of the thread pitch, the pulse signal output of the pulse generator 5, and the clock signal output of the oscillator 6, are applied to a function generator 7 which generates a function synchronous with the rotation of the main spindle, for example, a thread cutting function, and another function not synchronous with the rotation of the main spindle, for example, a quick feeding function. Thus, the function generator 7 generates a Z-axis drive instruction signal and an X-axis drive instruction signal.

The former and latter outputs of the function generator 7 are applied respectively to a pair of subtractors 8 and 9. In the subtractor 8, the output of a Z-axis position detector 14 representative of the momentary coordinate value of the physical position of the tool in the direction of the Z-axis is continuously subtracted from the Z-axis drive instruction output of the function generator 7. In the subtractor 9, the output of an X-axis position detector 15 representative of the momentary coordinate value of the physical position of the tool in the direction of the X-axis is continuously subtracted from the X-axis drive instruction output of the function generator 7. The output of the subtractor 8 is subjected to D-A conversion by a D-A converter 10, and the output of the D-A converter 10 is applied to a servo mechanism 12 which drives the tool in the direction of the Z-axis. Similarly, the output of the subtractor 9 is subjected to D-A conversion by another D-A converter 11, and the output of the D-A converter 11 is applied to another servo mechanism 13 which drives the tool in the direction of the X-axis.

The two outputs of the function generator 7 and the output of the thread pitch memory 4 are applied to an adder-subtractor 16 which acts to automatically add or subtract the thread pitch to and from the momentary coordinate values of the physical position of the tool in the directions of the Z-axis and X-axis while the tool is guided continuously along a predetermined path. The output of the adder-subtractor 16 is applied to a thread cutting command position changing circuit 18. The thread cutting command position information required for the thread cutting cycle is applied from the tape reader 2 to a temporary memory 17 to be sorted therein to be applied later to the thread cutting command position changing circuit 18. In response to the application of an interruption instruction signal 119 instructing interruption of the thread cutting operation of the tool, the thread cutting command position changing circuit 18 applies the output of the adder-subtractor 16 to the first memory 2 so that such output can now be stored in the first memory 2. On the other hand, in response to the application of a restarting instruction signal 120 instructing the restarting of the thread cutting cycle from the cylce starting point, the thread cutting command position changing circuit 18 applies the output of the temporary memory 17 to the first memory 2 so that such output can now be stored in the first memory 2 in place of the output of the adder-subtractor 16. The present invention is featured by the provision of the combination of the adder-subtractor 16, thread cutting command position temporary memory 17 and thread cutting command position changing circuit 18 constituting means for controlling the interruption of the thread cutting operation of the tool.

Figure 2:
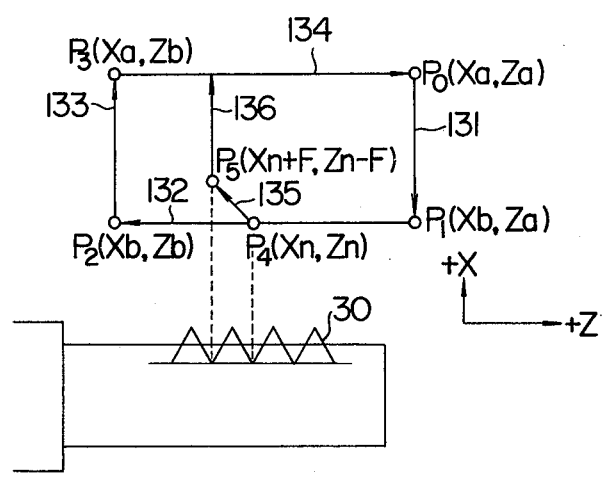
FIG. 2 shows a moving path of the threading tool when the system of the present invention is applied to a thread cutting lathe.

Referring to FIG. 2 showing a thread cutting cycle for cutting threads on a workpiece 30, the thread cutting cycle starts at a point $P_0$ ($Xa$, $Za$), and the thread cutting operation starts at a point $P_1$ ($Xb$, $Za$) and ends at a point $P_2$($Xb$, $Zb$). The threading tool starts to move from the point $P_0$ ($Xa$, $Za$) and returns to this point $P_0$ after moving past points $P_1$ ($Xb$, $Za$), $P_2$ ($Xb$, $Zb$) and $P_3$ ($Xa$, $Zb$) along a predetermined path consisting of portions 131, 132, 133 and 134 in directions as shown by the arrows. When an interruption instruction signal is applied during the motion of the tool adjacent to a point $P_4$ ($Xn$, $Zn$), the tool is pulled up from this point $P_4$ toward the path portion 134 past a point $P_5$($Xn$ + F, $Zn$ − F) along path portions 135 and 136. Information recorded on a tape are read by the tape reader 1 to be stored in the form of an electrical signal in the first memory 2. Table 1 shows, by way of example, a program of information of the thread cutting cycle stored in the first memory 2.

Table 1

| 141<br>[G00] | 142<br>[Xa Za] | |
|---|---|---|
| 143<br>[G33] | 144<br>[Xb Zb] | 145<br>[F] |

The code G00 in the block 141 in Table 1 represents an instruction for positioning the tool at the starting point $P_0$ ($Xa$, $Za$) of the thread cutting cycle, and the information $Xa$, $Za$ in the block 142 instructs the starting point $P_0$ ($Xa$, $Za$) of the thread cutting cycle. The code G33 in the block 143 instructs the thread cutting cycle, and the information $Xb$, $Zb$ in the block 144 instructs the motion of the tool toward the thread cutting command point $P_2$ ($Xb$, $Zb$). Further the information F in the block 145 instructs the thread pitch and the feedrate of the tool.

Before describing the operation of the system according to the present invention, the operation of a prior art system, which is similar to FIG. 1 but not provided with the thread cutting interruption control circuit consisting of the adder-subtractor 16, thread cutting command position temporary memory 17 and thread cutting command position changing circuit 18, will be described when the motion of the tool is controlled according to the program shown in Table 1.

In the first sequence, the code G00 and information $Xa$, $Za$ are applied to the first memory 2, thence to the thread cutting cycle control circuit 3. In response to the application of the output of the thread cutting cycle control circuit 3 together with the outputs of the pulse generator 5 and oscillator 6, the function generator 7 generates quick feed function outputs for quickly feeding the tool in both the directions of the Z-axis and X-axis. These outputs are respectively applied through the subtractors 8, 9 and D-A converters 10, 11 to the servo mechanisms 12 and 13 associated with the Z-axis and X-axis, so that the tool can be fed quickly toward the starting point $P_0$ ($Xa$, $Za$) of the thread cutting cycle. The outputs of the function generator 7 are continuously compared with the output ($Xa$, $Za$) of the first memory 2 in the thread cutting cycle control circuit 3. When coincidence therebetween is detected, a coincidence signal is applied to the function generator 7 to cease the quick feed function generation by the function generator 7, and the tool is precisely positioned at the starting point $P_0$($Xa$, $Za$) of the thread cutting cycle. At this time, the information of the starting point $P_0$ ($Xa$, $Za$) of the thread cutting cycle is stored in the thread cutting cycle control circuit 3.

In the second sequence, the code G33 and information $Xb$, $Zb$, except the information F, are applied to the first memory 2, thence to the thread cutting cycle control circuit 3. In response to the application of the code G33 instructing the thread cutting cycle, the thread cutting cycle control circuit 3 seeks the thread cutting starting position, that is, the point $P_1$ ($Xb$, $Za$) in FIG. 2 on the basis of the information of the thread cutting cycle starting point $P_0$ ($Xa$, $Za$) stored already therein and the information of the thread cutting command point $P_2$ ($Xb$, $Zb$) applied newly thereto. Further, the thread cutting cycle control circuit 3 applies a control signal to the function generator 7. As a result, the function generator 7 generates a quick feed function output for quickly feeding the tool in the direction of the X-axis only. After the tool is precisely positioned at the thread cutting starting point $P_1$ ($Xb$, $Za$), the thread cutting cycle control circuit 3 applies another control signal to the function generator 7. As a result, the function generator 7 generates a thread cutting function output for feeding the tool in the direction of the Z-axis only so that the tool can be fed toward the thread cutting command point $P_2$ ($Xb$, $Zb$) to cut the threads on the workpiece 30 at the feedrate instructed by the thread pitch information F. In this case, the latter output of the function generator 7 for feeding the tool in the direction of the Z-axis starts to appear in response to the application of the synchronizing pulse signal generated by the pulse generator 5 for indexing the angular position of the rotating main spindle, hence the cutting phase of the threads. The rotation-responsive pulse signal is generated by the pulse generator 5 in proportion to the rotation of the main spindle of the machine tool in such a relation that $n$ pulses are generated during one complete rotation of the main spindle. The latter output of the function generator 7 is generated at a rate of F/n, where F is the thread pitch information stored in the thread pitch memory 4, so that the threads can be cut on the workpiece 30 at the pitch F. As in the case of the tool positioning described above, the outputs of the function generator 7 are continuously compared in the thread cutting cycle control circuit 3 with the information of the instructed thread cutting command point $P_2$ (X$b$, Z$b$) applied from the first memory 2, and the thread cutting cycle control circuit 3 acts to cease the thread cutting function generation by the function generator 7 when coincidence is attained between the inputs.

When the tool is fed to the point $P_2$ (X$b$, Z$b$), the function generator 7 quick feed function outputs for quickly feeding the tool toward the point $P_3$ (X$a$, Z$b$) along the path portion 133 and then toward the original point $P_0$ (X$a$, Z$a$) along the path portion 134. In order that the tool can be fed along the path portions 131 to 134 in FIG. 2 according to the instructions provided by the blocks 143 to 145 in the second sequence shown in Table 1, the two outputs of the function generator 7 are applied respectively to the servo mechanisms 12 and 13 through the subtractors 8, 9 and D-A converters 10, 11 to feed the tool in both the directions of the Z-axis and X-axis to complete the thread cutting cycle.

The novel and improved control system according to the present invention operates in a manner as described below in response to the appearance of a signal instructing interruption of the thread cutting operation of the tool. Suppose now that a thread cutting interruption instruction signal 119 is applied to the thread cutting command position changing circuit 18 when the tool is fed to the point $P_4$ (X$n$, Z$n$) along the path portion 132 under control of the thread cutting function outputs of the function generator 7. In such a case, the coordidnate values of the thread cutting command point $P_2$(X$b$, Z$b$) stored in the first memory 2 must be changed to the coordinate values X$n$ + F, Z$n$ − F obtained by adding and subtracting the thread pitch F stored in the thread pitch memory 4 to and from the outputs of the function generator 7 representative of the coordinate values X$n$, Z$n$ of the point $P_4$, in order that the generation of the thread cutting function outputs of the function generator 7 can be ceased after the "pull-up motion of the tool" along the path portion 135. Therefore, the output of the adder-subtractor 16 representative of the coodinate values X$n$ + F, Z$n$ − F of the point $P_5$ is applied through the thread cutting command position changing circuit 18 to the first memory 2 to replace the previous information stored therein. Thus, in response to the application of the thread cutting interruption instruction signal 119 to the thread cutting command position changing circuit 18 when the tool is fed to the point $P_4$ (X$n$, Z$n$) under control of the thread cutting function outputs of the function generator 7, the function generator 7 ceases to generate the thread cutting function outputs after the tool is moved to the point $P_5$(X$n$ + F, Z$n$ − F) as a result of the "pull-up motion of the tool." Subsequently, the function generator 7 generates the quick feed function outputs under control of the thread cutting cycle control circuit 3, and the tool is quickly fed along the path portions 136 and 134 until finally it is brought to a halt at the thread cutting cycle starting point $P_0$(X$a$, Z$a$).

After chips are removed to eliminate the cause of the interruption of the thread cutting operation of the tool, a restarting instruction signal 120 is applied to the thread cutting command position changing circuit 18. In response to the application of the restarting instruction signal 120 to the thread cutting command position changing circuit 18, the information of the threading cutting command point $P_2$(X$b$, Z$b$) previously stored in the temporary memory 17 is applied through the thread cutting command position changing circuit 18 to the first memory 2 again in order that the thread portion left uncut due to the application of the interruption instruction signal 119 can be cut by the tool. This information of the thread cutting command point $P_2$(X$b$, Z$b$) is used to continue the thread cutting cycle. After the completion of this thread cutting cycle, the machine tool operates according to the information provided by the tape.

It will be understood from the foregoing detailed description of the present invention that a thread cutting interruption control circuit of simple construction consisting of an adder-subtractor 16, a thread cutting command position temporary memory 17 and a thread cutting command position changing circuit 18 is added to a prior art control system adapted for controlling the operation of a numerically controlled machine tool used for cutting threads on workpiece. Therefore, in response to the application of a thread cutting interruption instruction signal during thread cutting by the tool on the workpiece in order to prevent breakage of the tool due to twining of a continuous chip around the workpiece or tool, the "pull-up motion of the tool" is automatically done, and then the tool is automatically quickly fed back to the starting position of the thread cutting cycle to be brought to a halt at such position. Thus, the present invention is advantageous in that there is utterly no possibility of producing rejects, and the tool can also be remarkably effectively maintained. The present invention is further advantageous in that, after removal of the chips, the thread portion left uncut can be cut by the tool before the normal thread cutting operation takes place.

It can be recognized by one skilled in the art that the present invention can be modified and changed without departing from its scope. The scope of the invention, therefore, is to be determined by the claims appended hereto.

We claim:

1. A system for controlling the operation of a numerically controlled machine tool adapted for cutting a thread on a workpiece comprising means for reading various input information for instructing the cutting of the thread; first memory means for storing the input information; thread cutting cycle control means for controlling the thread cutting cycle according to the output of said first memory means; thread pitch memory means for storing the thread pitch information read by said reading means; pulse generating means for generating a pulse signal proportional to the rotation of the spindle of the tool; and function generating means for generating function outputs in response to the application of the outputs of said thread cutting cycle control means, said thread pitch memory means and said pulse generating means to thereby control a servo mechanism for feeding the tool in directions normal to each other, said control system comprising thread interruption control means for effecting a "pull-up motion of the tool".

2. A system according to claim 1 wherein the thread interruption control means comprises an adder-subtractor means for carrying out addition and subtraction of the output of said thread pitch memory means to and from the function output and variable depending on the position of the tool along a predetermined path; temporary memory means for storing a thead cutting command position read by the reading means; and thread cutting command position changing means for applying the output of the adder-subtractor means to the first memory means in response to the application of an interruption instruction signal during the thread cutting operation to thereby replace the thread cutting command position information previously stored in the first memory means by the output of the adder-subtractor means.

3. A system according to claim 2 wherein the thread cutting command position changing means applies the output of the temporary memory means to the first memory means in response to the application of a restarting instruction signal to thereby restart the thread cutting cycle after elimination of the cause requiring the interruption of the thread cutting operation.

4. A system according to claim 1 wherein the means for reading comprises a tape reader for instructing the thread cutting code, the thread pitch, the thread cutting cycle starting position required for cutting the thread and the thread cutting command position in the thread cutting cycle.

5. A system according to claim 4 wherein the first memory means stores the input information except the thread pitch.

6. A system for controlling the operation of a numerically controlled machine tool adapted for cutting a thread on a workpiece comprising means for reading and storing various input information for instructing the cutting of the thread, thread cutting cycle control means for cutting and controlling the cycle of the tool according to the input information and thread cutting interruption control means for effecting the removal of the tool from the workpiece by a "pull-up-motion of the tool" in response to a reason incidental to the thread cutting.

7. A system according to claim 6 wherein the thread cutting interruption control means responds to the application of an interruption instruction signal during the thread cutting operation of the tool.

8. A system according to claim 6 wherein the thread cutting interruption control means effects removal of the tool from the workpiece along two independent axes.

9. A system according to claim 6 wherein the thread cutting interruption control means returns the tool to the starting position of the thread cutting cycle.

10. A system for controlling the operation of a numerically controlled machine tool adapted for cutting a thread on a workpiece comprising means for reading and storing various input information for instructing the cutting of the thread, thread cutting cycle control means for cutting and controlling the cycle of the tool according to the input information and thread cutting interruption control means for effecting the removal of the tool from the workpiece along two independent axes in response to a reason incidental to the thread cutting.

11. A system according to claim 10 wherein the thread cutting interruption control means effects a "pull-up-motion" of the tool.

12. A system according to claim 10 wherein the thread cutting interruption control means responds to the application of an interruption instruction signal during the thread cutting operation of the tool.

13. A system according to claim 10 wherein the thread cutting interruption control means returns the tool to the starting position of the thread cutting cycle.

14. A system as claimed in claim 4, wherein said adder-subtractor means adds or subtracts the thread pitch value to and from the X-axis and Z-axis coordinate values of the tool when said interruption instruction signal is applied to said thread cutting command position changing means.

* * * * *